(12) United States Patent
Clift, Jr.

(10) Patent No.: US 6,609,721 B2
(45) Date of Patent: Aug. 26, 2003

(54) SELF PROPELLED MULTI-AXLE SCOOTER

(76) Inventor: Gilbert B. Clift, Jr., 4514 Live Oak Dr., Mesquite, TX (US) 75150

( * ) Notice: Subject to any disclaimer, the term of this patent is extended or adjusted under 35 U.S.C. 154(b) by 0 days.

(21) Appl. No.: 10/104,891

(22) Filed: Mar. 22, 2002

(65) Prior Publication Data

US 2002/0167150 A1 Nov. 14, 2002

Related U.S. Application Data

(60) Provisional application No. 60/278,210, filed on Mar. 23, 2001.

(51) Int. Cl.$^7$ ................................................. B62K 11/00
(52) U.S. Cl. ................ 280/210; 280/14.21; 280/87.041
(58) Field of Search .......................... 280/14.21, 14.27, 280/14.28, 87.041, 87.042, 200, 210, 214, 220, 221, 229

(56) References Cited

U.S. PATENT DOCUMENTS

| 1,557,634 A | 10/1925 | Walter ........................ 280/210 |
| 1,617,357 A | 2/1927 | Walter ........................ 280/210 |
| 3,086,795 A | 4/1963 | Hatcher et al. ............. 280/210 |
| 3,831,977 A | 8/1974 | Osborne et al. ............ 280/229 |
| 3,992,029 A | 11/1976 | Washizawa et al. ........ 280/221 |
| 4,669,746 A | 6/1987 | Wu ............................. 280/221 |
| 5,110,148 A | 5/1992 | Stienbarger et al. ........ 280/221 |
| 5,224,724 A | 7/1993 | Greenwood ................. 280/221 |
| 6,220,609 B1 | 4/2001 | Jones ........................ 280/1.13 |
| 6,260,871 B1 * | 7/2001 | Liu ............................. 280/277 |

* cited by examiner

Primary Examiner—Lesley D. Morris
Assistant Examiner—L. Lum
(74) Attorney, Agent, or Firm—Roger M. Rathbun

(57) ABSTRACT

A self propelled scooter that has a pair of wheels that ride on the ground and a frame having a footboard mounted between the wheels. The rear wheel has a shiftable axle, that is, the axle that rotatably affixes the rear wheel to the frame can be moved between a location that is at the center of the rear wheel where the user can readily coast the scooter and a location offset with respect to the center of the wheel where that offset location allows the user to employ a pumping action and use the weight of the user on the footboard to propel the scooter forwardly. A mechanism operable by the user allows the user to selectively move the rear axle between the two locations so that the user can pump the scooter to gain speed when the axle is in the offset location and then shift the axle back to the center location to dissipate that speed by allowing the scooter to coast.

20 Claims, 4 Drawing Sheets

PUMP MODE

SELF PROPELLED MULTI-AXLE SCOOTER

RELATED APPLICATIONS

The present application is based upon U.S. Provisional Patent Application Serial No. 60/278,210 filed Mar. 23, 2001 and entitled SCOOTER WITH PUMPING MECHANISM.

BACKGROUND OF THE INVENTION

The present invention relates to a scooter, and more particularly, to a self propelled scooter that can be propelled by the weight of the user applied at periodic time intervals to the scooter.

There are, of course, a considerable number of different scooters that are in use and which have been proposed for adults or children to use as pleasure vehicles and recreation. Of course the classic scooter is simply comprised of a frame that extends between two wheels and those wheels are rotatably affixed to the frame by means of axles that are affixed to the frame at fixed spaced apart locations and such axles are positioned at the center of the circular wheels. Accordingly, the user can maintain one foot on a footboard area of the frame intermediate the wheels and use the other foot to make intermittent contact with the ground to push the scooter forwardly.

Aside from the traditional scooter, however, there are also other scooters that can be self-propelled in the sense that there is some mechanism built into the scooter that can be activated by the foot of the user to employ the weight of the user to produce a force to propel the scooter forwardly. An example of such a scooter is shown and described in U.S. Pat. No. 3,086,795 of Hatcher et al where the footboard of the scooter is affixed to the rear wheel at an axle position that is offset from the center of the rear wheel so that the user can shift his weight up and down in a pumping action to propel the scooter over the ground. By such motion, therefore, the scooter can be, in a manner, self-propelled by the user without the normal intermittent contact with ground. A difficulty with the Hatcher et al scooter, however, is that the user cannot easily coast since the eccentric position of the rear axle will continue the up and down motion as long as the scooter is moving over the ground and is not efficient for coasting.

A further example of a self-propelled scooter is shown and described in U.S. Pat. No. 5,224,724 of Greenwood where an additional axle is provided that is separately propelled by a rocking lever that cooperates with the offset mechanism in the rear wheel to move the scooter forwardly without need of the user having to make the intermittent contact with the ground. Again, however, there would seem to be no way to coast with the Greenwood scooter since the lever action would continue to move up and down as the user moves the scooter.

Accordingly, it would be advantageous to have a scooter that would be relatively easy to manufacture and assemble and which is propelled by the user by some offset axle mechanism that utilizes the weight of the user to bring about the forward motion of the scooter while, at the same time, also have the ability of the user to simply coast so that the user can take advantage of the speed achieved to rest or in riding the scooter down a hill and the up and down pumping is not needed to move the scooter forwardly.

SUMMARY OF THE INVENTION

Therefore, in accordance with the present invention, there is provided a specially constructed scooter that combines the features of a self propelled scooter with the ability to simply coast on the scooter and not continue the pumping action.

Accordingly, with the present scooter, there are a pair of circular wheels that ride on the ground as the scooter is propelled. There is a scooter frame that extends between the wheels and each wheel has an axle with which the wheels are affixed to the frame so that the wheels are rotatably affixed to that frame. A footboard is provided on the frame intermediate the wheels for the rider to place one or both feet in riding the scooter.

One of the wheels, preferable the rear wheel, has a mechanism that allows the user to selectively move the axle from the center of the rear wheel to an offset or eccentric position that is radially displaced with respect to the center of the wheel. As such, the user can selectively move the axle to which the frame is connected between two positions i.e. a first position located at the center of the wheel so that the user can easily and efficiently coast on the scooter and a second position that is offset or eccentric with respect to the center of the wheel so that the user can employ the pumping action and use the weight of the user to propel the scooter forwardly. In addition, the scooter of the present invention is useful as an exercise device as the pumping motion technique is conducive to providing exercise to the user in a fun environment.

Other features of the self-propelled, multi-axle scooter will become apparent in light of the following detailed description of a preferred embodiment thereof and as illustrated in the accompanying drawings.

DETAILED DESCRIPTION OF THE INVENTION

Figure 1:
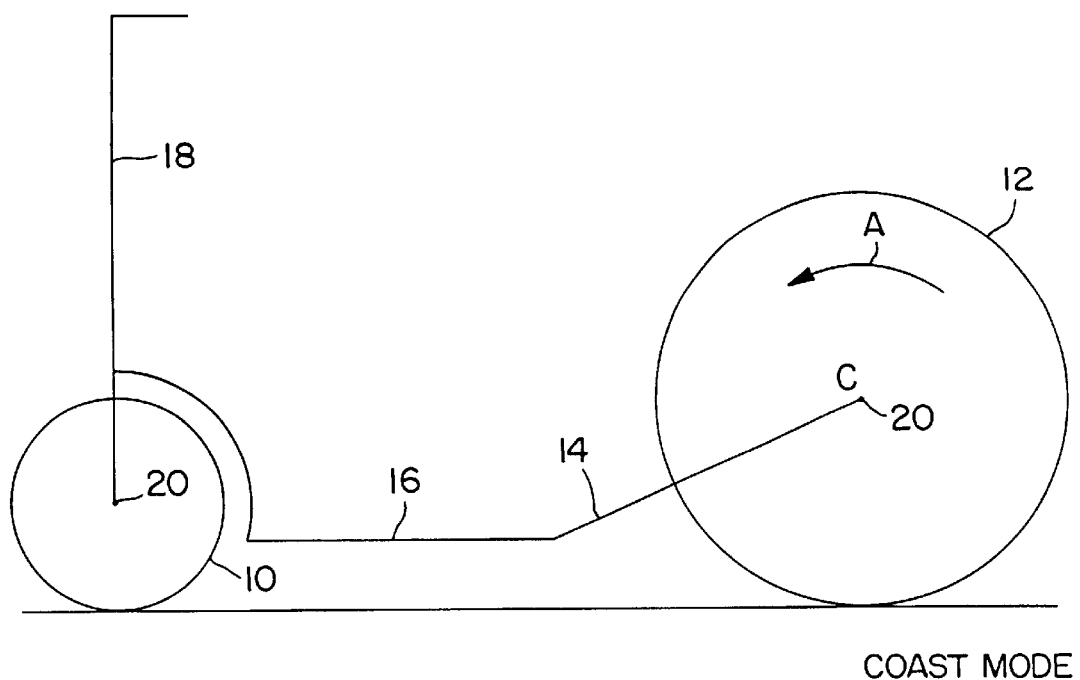
FIG. 1 illustrates prior art, and is a schematic view of a conventional scooter that can be coasted in normal manner.

Referring now to FIG. 1, there is shown a schematic view of a conventional scooter and which comprises a front wheel 10, a rear wheel 12 and a scooter frame 14 that spans between the front and rear wheels 10, 12 and includes a flattened area or footboard 16 where the user can position one or both feet as the scooter travels over the ground. At the front of the scooter is a set of handlebars 18 to be gripped by the hands of the user in using the scooter in conventional manner.

As also is conventional, both of the front and rear wheels 10, 12, has an axle 20 that allows the front and rear wheels 10, 12 to rotate freely while remaining affixed to and be supportive of the scooter frame 14 and to position that scooter frame 14 above the ground. As is normal, with the use of the scooter shown, the rider may maintain one foot on the footboard 16 while the other foot makes an intermittent pushing contact with the ground to propel the scooter forwardly and when a sufficient speed is attained, the user can easily coast by keeping the propelling foot off the ground or by positioning both feet riding on the footboard 16.

The coasting action is achieved in that the axle 20 of the scooter is positioned at the center of both the front and rear wheels 10, 12, that is, the axles 20 of the wheels are in the geometric center of the circular wheels. That center of the rear wheel 12 is designated as C in the Figure and the forward direction of the rear wheel 12 is designated by the arrow A.

Figure 2:
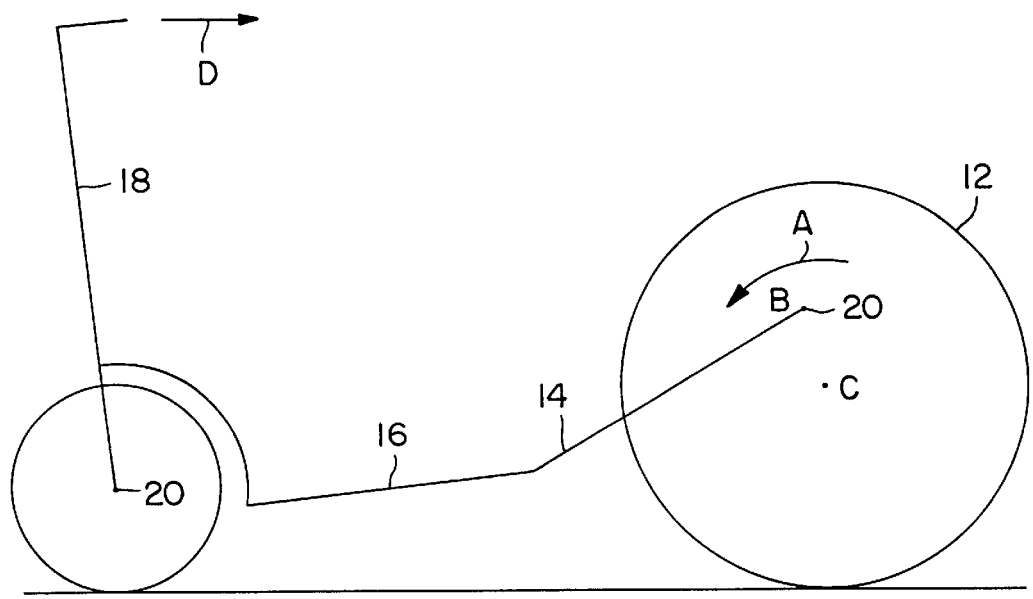
FIG. 2 illustrates prior art, and is a schematic view of a scooter having an offset axle that can be self propelled by a pumping motion by the user.
Figure 3:
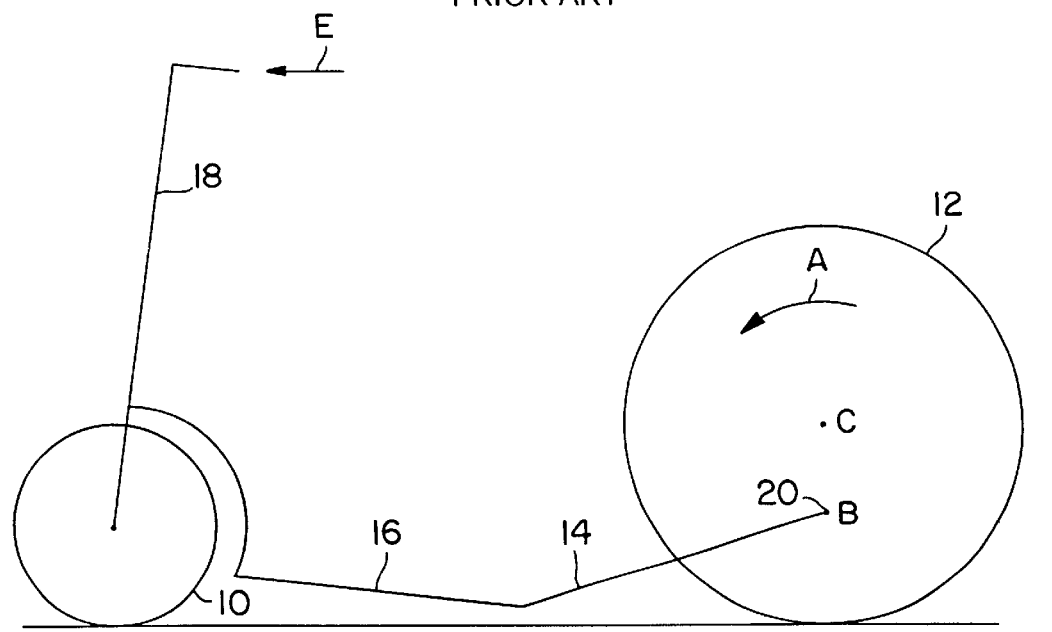
FIG. 3 illustrates prior art, and is a further schematic view of the scooter of FIG. 2.

Turning next to FIGS. 2 and 3, there is shown a further scooter, again, using the same convention as in FIG. 1, there is a front wheel 10, a rear wheel 12 and a scooter frame 14 extending therebetween and affixed to axles 20 on the front and rear wheels 10, 12. In the FIGS. 2 and 3 embodiment, however, the rear axle 20 is located at a position designated B which, as can be seen, is offset, or radially displaced with respect to the center C of the rear wheel 12.

Thus in the FIGS. 2 and 3 embodiment, the scooter can be self propelled without need for the intermittent pushing contact with the ground, that is, the scooter can be powered over the ground by means of a pumping action by the user employing the users weight at certain intervals acting on the footboard 16. To further explain, in FIG. 2, the offset axle B can seen to be approaching its downward motion of the scooter moving forwardly and with the rear wheel 12 moving in the direction of the arrow A and at this point, the user can push downwardly using the weight of the user on the footboard 16 while at the same time pulling rearwardly on the handlebars 18, shown by the arrow D and force the scooter in the forward direction.

Conversely, in FIG. 3, the offset axle B is starting its upward movement and the user can lift upwardly with the users weight and push forwardly on the handlebars 18 in the direction of the arrow E to encourage the offset axle B to again reach the uppermost point in its travel to again deliver a power stroke.

In the aforedescribed manner, the scooter of the embodiment shown in FIGS. 2 and 3 can be self-propelled without the user contacting the ground. A difficulty arises, however, in that the user cannot readily coast with that embodiment as the offset axle 20 at the position B prevents a smooth coasting action. Therefore, in the event the user is traveling downhill or has attained sufficient speed that a rest is desired, it is simply not possible to coast the scooter smoothly.

Figure 4:
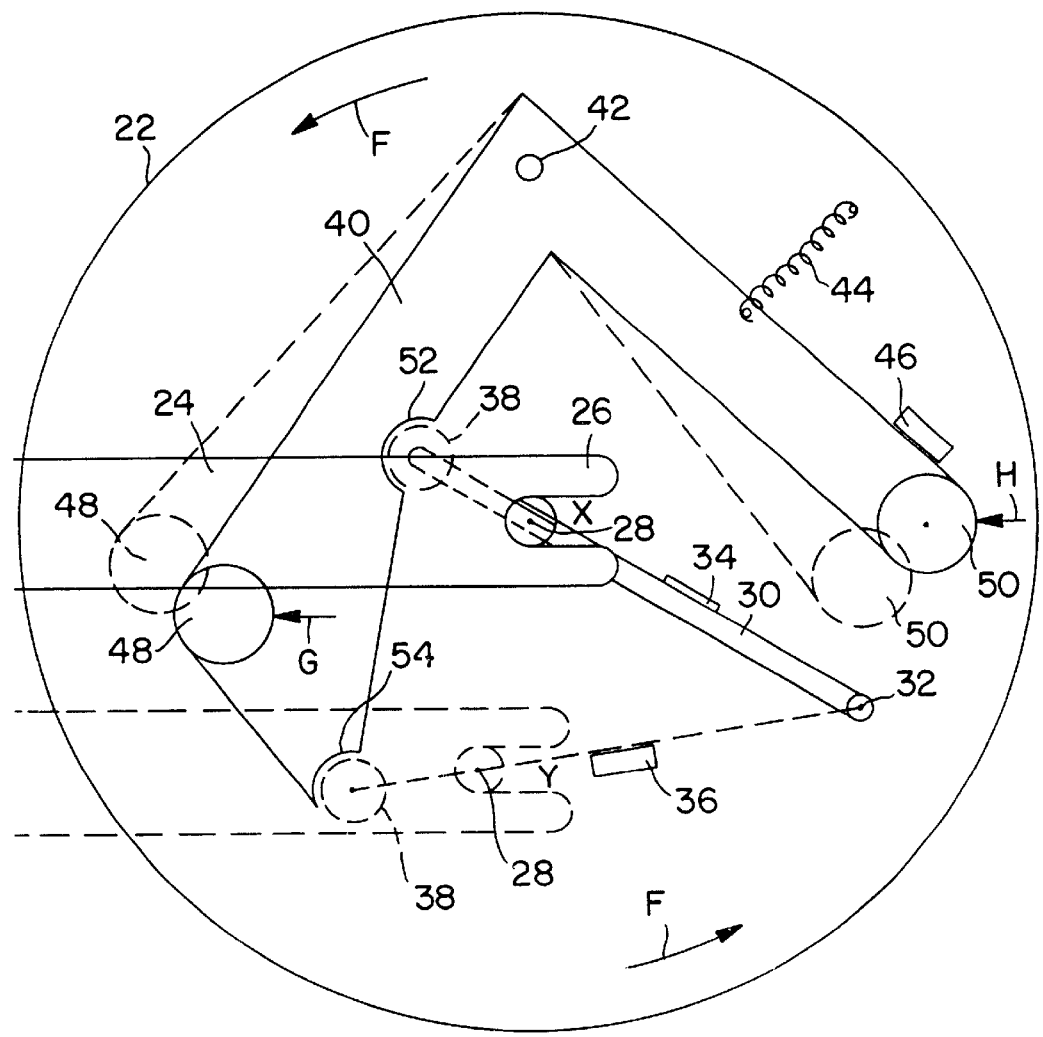
FIG. 4 is a side view of a scooter wheel constructed in accordance with the present invention.
Figure 5:
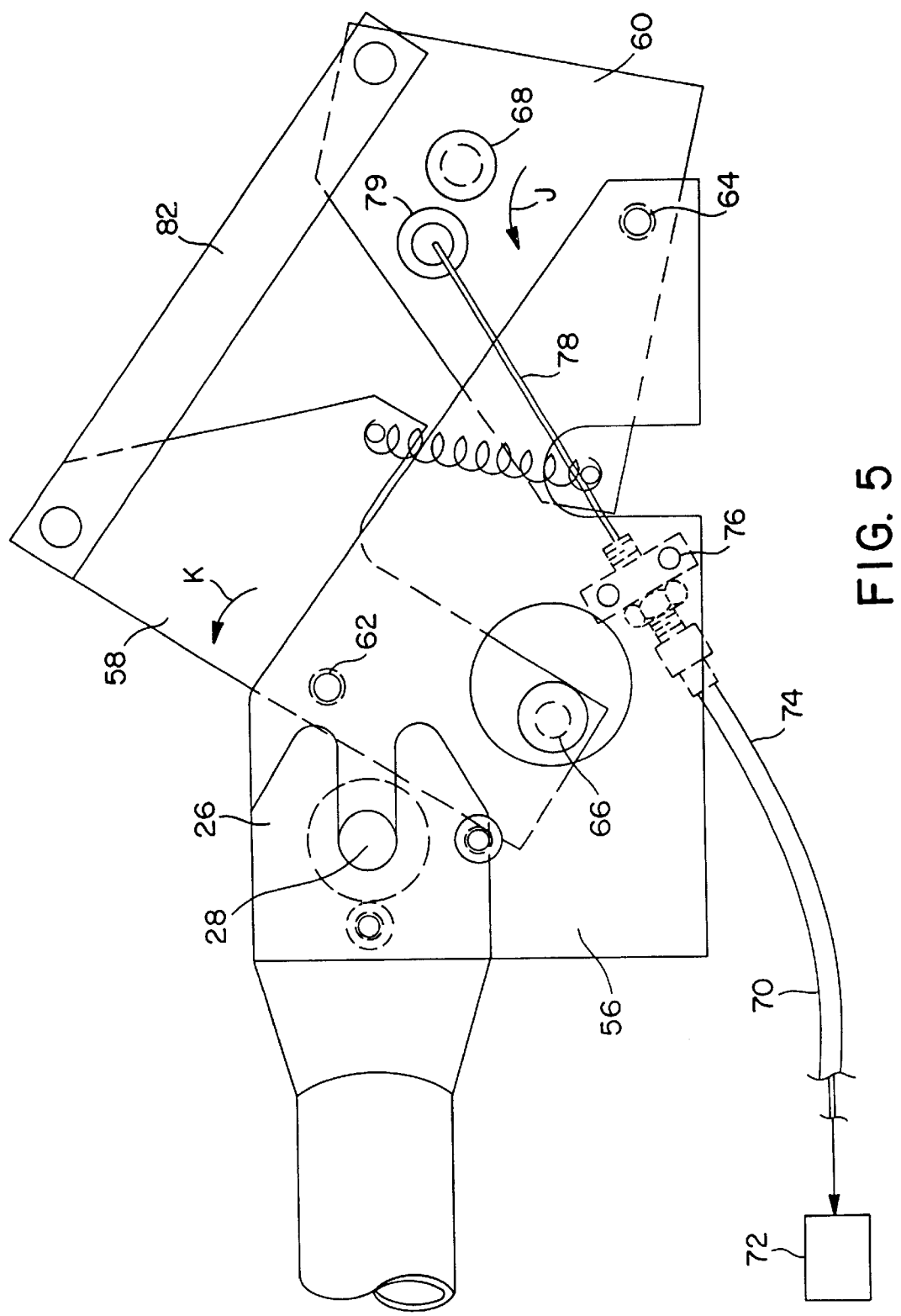
FIG. 5 is a side view of a mechanism to change the axle position of a scooter in accordance with the present invention.

Accordingly, turning now to FIGS. 4 and 5, there is shown, respectively, a side view of a bi-axle position wheel 22 suitable for use on a scooter in carrying out the present invention and a side view of a shifting mechanism that is used with the present invention to carry out the shifting of an axle position for a vehicle such as a scooter. As will be seen, the present invention can be used for a variety of differing vehicles, however for purposes of the present specification, the invention will be described with specific reference to a scooter. The present invention has the self-pumping feature of the embodiment of FIGS. 2 and 3 and yet attains the smooth coasting of the embodiment of FIG. 1 by providing a shifting mechanism that allows the user, at will, to shift the location of the axle of the rear wheel between a center position of the FIG. 1 embodiment and the offset position or eccentric axle of the embodiment of FIGS. 2 and 3.

Basically, the present invention comprises two devices. First, there is a wheel that is bi-stable and has two axle positions, one of which is in the center of the wheel and therefore appropriate for coasting of the scooter and the other axle position is offset or eccentric from the center of the wheel and therefore is applicable to use of the pumping motion to self propel the scooter. Secondly, the other basic device is a mechanism, activatable by a user, to enable that user to shift the axle position between those two axle positions to take advantage of the features of both axle positions.

Taking, therefore FIGS. 4 and 5, in FIG. 4 the wheel 22 having two axle positions is shown and in FIG. 5, the mechanism for shifting the axle between those two positions is shown.

Thus, taking first FIG. 4, the wheel 22 is shown and which travels over the ground by rotating in the direction of the arrow F. The wheel 22 itself is preferably an aluminum wheel, which may be constructed of two circular aluminum plates fastened together, or a single piece of aluminum or other metal can be used, and which also has a rubber tire (not shown) affixed to the outer peripheral surface of the wheel 22. As can be seen the scooter frame 24 terminates in a pair of bifurcated forks 26, spaced apart, and the scooter axle 28 fits intermediate each of the forks 26 much the same as in a conventional bicycle and it should be noted that the axle 28 remains affixed within the pair of forks 26 throughout the further shifting procedures of this invention.

The fork 26 is shown in the solid position in FIG. 4 when the axle 28 of the scooter is located in the center of the wheel 22 and in the dotted line position when the axle 28 is in its offset or eccentric position with respect to the center position. Thus, the axle 28 can be shifted between the center position, position X and the eccentric position, shown as position Y. That shifting can be accomplished by means of a axle lever 30 that is pivotally mounted to the wheel 22 at the axle lever pivot point 32 and can pivot between the solid line position where the axle 28 is in position X and the dotted line position where the axle 28 is in position Y. A pair of stops 34, 36, also affixed to the wheel 22, limit the angular movement of the axle lever 30 to the solid line and dotted line positions. The axle lever 30 is also affixed to the axle 28 and to a roller 38. Thus, as the axle lever 30 moves so do the axle 28 and the roller 38.

A latch lever 40 is also pivotally affixed to the wheel 22 at a latch lever pivot point 42 and is biased to the solid line position shown in FIG. 4 by means of a spring 44. A stop 46 holds the latch lever 40 in the solid line position and biased to that position by the spring 44. A first cam 48 is affixed to the latch lever 40 and a second cam 50 is also affixed to the latch lever 40, the purpose of the first and second cams 48, 50 will be later explained. There are also a pair of partial circular recesses, shown as a first circular recess 52 and a second circular recess 54 formed in the latch lever 40.

As can now be seen, the roller 38 fits within the first circular recess 52 when the axle 28 is located in the solid line position or position X, that is, where the axle 28 is located at the center of the wheel 22 and therefore the scooter can coast freely. When, on the other hand, the roller 38 is located in the dotted line position, or within the second circular recess 54, the axle is in its position Y, and is eccentric to the center of the wheel 22 so that the scooter can be pumped to provide the forward motive power.

Thus, by simply shifting the axle 28 where the roller 38 is captured within the first or second circular recesses 52, 54, the axle lever 30 can be locked into position X or position Y. To move that roller 38 between those two positions, the axle lever 40 can move by gravity when it is released from the constrained positions where the roller 38 is captured within the first or the second circular recesses 52 and 54. As also can be seen, the latch lever 40 can be moved from its solid line position where the roller 38 is captured within one of the circular recesses 52, 54, to the dotted line position where the latch lever 40 releases the roller 38 to be free to move between the X and Y positions where the roller 28 is, respectively, captured in one of the circular recesses 52, 54.

To release the roller 38, therefore, the latch lever 40 only needs to be moved from its solid line position biased by the spring 44 to the dotted line position and, as can be seen, that movement can be effected by moving either the first cam 48 in the direction of the arrow G or by moving the second cam 50 in the direction of the arrow H, that is, if either the first or second cams 48, 50 are moved, both cams will effectively move.

Accordingly, the means to move the first and second cams 48, 50 is provided by the mechanism that is shown in FIG. 5 and will be explained also with reference to FIG. 4. Thus, turning to FIG. 5, there is shown a side view of the mechanism that is used to move the first and second cams 48, 50 to move the latch lever 40 to its dotted line position to allow the roller 38 to move between position X and position Y. In this Figure, the fork 26 is shown and there is a mounting block 56 that is affixed to the axle 28 at fork 26 and that mounting block 56 is affixed external to the twin forks 26. As shown in the Figure, the mounting block 56 is positioned on the far side of the wheel 22 of FIG. 4.

Pivotally affixed to the mounting block 56 is a pair of levers, identified as a first lever 58 and a second lever 60. The first lever 58 is pivotally affixed to the mounting block 56 at a first lever pivot point 62 and the second lever is pivotally affixed to the mounting block 56 at a second lever pivot point 64. Each of the first and second levers 58, 60 has a actuator cam, identified as a third cam 66 and fourth cam 68. The third and fourth cams 66 and 68 are movable along with the first and second levers 58, 60 to contact and move the first and second cams 48, 50 of FIG. 4 to move the latch lever 40 in releasing the axle 28 for movement between position X and position Y.

To therefore move the first and second levers 58, 60 a Bowden cable 70 is provided that is routed to a lever located on the handlebars, much the same as with a hand brake activator or hand grip 72 found on many bicycles. As such, the other end of the Bowden cable 70 has its outer sheath 74 affixed to the mounting block 56 by a clamp 76 and the inner wire 78 extends outwardly and is connected to the second lever 60 at a post 78. Thus, when the inner wire 78 is pulled into the Bowden cable 70 as the user squeezes the hand grip 72 at the other end of the Bowden cable 70, the second lever 60 moves in the direction of the arrow J and moves the fourth cam 68 into direct contact with the second cam 50 as the rotating wheel 22 passes by such that the latch lever 40 disengages from the roller 38 and the axle 28 is free to move to the concentric position, or position X by the force of gravity. When in the concentric or position X, the scooter is free to coast without hindrance to the user.

The same means is used to move the roller 38 back to the position Y since, by activating the inner wire 78, the movement of the second lever 60 also rotates the first lever 58 by means of a connecting link 82 and which therefore rotates the first lever 58 about its first lever pivot point 62 in the direction of the arrow K. That movement shifts the third cam 66 toward the first cam 48 and therefore that third cam 66 contacts the first cam 48 to move it in the direction of the arrow G on FIG. 4 to cause the latch lever 40 to move out of engagement with roller 38 and, again, by gravity, the axle 28 moves from the concentric position X back to the eccentric position Y such that the scooter is in the pump mode and the user can motivate the scooter by the pumping action.

Accordingly, the present mechanism and the specially constructed wheel 22 and the use of a hand grip 72 positioned on the handlebars, allow the location of the axle 28 to move between the centered position X where the scooter can coast and the eccentric position Y where the user can pump the scooter to propel the scooter over the ground.

It will be understood that the scope of the invention is not limited to the particular embodiment disclosed herein, by way of example, but only by the scope of the appended claims.

I claim:

1. A self-propelled vehicle, said vehicle comprising a pair of spaced apart circular wheels, each of said wheels having an axle about which each wheel rotates, a frame affixed to said axle of each of said wheels and extending therebetween, said frame having a footboard for a user to place a foot, a mechanism affixed to one of said wheels to move said axle of said one of said wheels between a first location wherein said axle is positioned at the center of the circular wheel and a second location offset a predetermined radial distance from said first location, said mechanism operable by a user to selectively move said axle between said first and said second locations.

2. A self-propelled vehicle as defined in claim 1 wherein said one of said wheels is a rear wheel.

3. A self-propelled vehicle as defined in claim 2 wherein said vehicle is a scooter.

4. A self-propelled vehicle as defined in claim 2 wherein said mechanism comprises an axle lever having one end pivotally affixed to said wheel at a pivot point displaced with respect to the center of said rear wheel, and has a roller affixed to the other end, said axle lever being affixed to said axle of said rear wheel at a point intermediate said one end and said other end, said axle lever being movable between a center position where said axle is in said first position and an eccentric position wherein said axle is positioned at said second location.

5. A self propelled vehicle as defined in claim 4 wherein said axle lever is spring biased to said center position.

6. A self propelled vehicle as defined in claim 5 wherein said mechanism includes a latch lever having a first and a second circular recess and wherein said roller is held within said first circular recess when said axle lever is in said center position and said roller is held within said second recess when said axle lever is in said eccentric position.

7. A self propelled vehicle as defined in claim 6 wherein said latch lever is pivotally affixed to said wheel and is movable by a user to release said roller from being held in said first and second recesses to allow said latch lever to move by gravity to the other of said first or second recesses.

8. A self propelled vehicle as defined in claim 7 wherein said mechanism is operable by the user by means of a hand operated grip device connected to said mechanism by a sheathed cable.

9. A self propelled vehicle as defined in claim 8 wherein said frame includes handlebars for gripping by the user and said hand operated grip device is located on said handlebars.

10. A self propelled vehicle as defined in claim 8 wherein said mechanism includes at least one latch lever cam affixed to said latch lever, and at least one actuator cam movably affixed to said frame, said at least one actuator cam being movable by said hand operated grip device to a position where said at least one actuator cam contacts said at least one latch lever cam to move said latch lever to release said roller.

11. A self propelled vehicle as defined in claim 10 wherein said at least one latch lever cam comprises two latch lever cams and said at least one actuator comprises two actuator cams, both of said actuator cams being movable to contact and move said latch lever cams to release said roller.

12. A wheel having a mechanism for shifting a wheel axle from a center position to an eccentric position of the wheel, said mechanism comprising:

an axle lever having one end pivotally affixed to the wheel at an axle lever pivot point and having a roller affixed to the other end of said axle lever, said axle lever affixed to said wheel axle at a point intermediate said one end and said other end, said axle lever adapted to be pivoted about said axle lever pivot point between a first location wherein said axle is aligned with the center of said wheel and a second location wherein said axle is located displaced with respect to said center of said wheel, said mechanism operable to selectively move said wheel axle between said first and said second locations.

13. A wheel as defined in claim 12 wherein said axle lever is spring biased to said first location.

14. A wheel as defined in claim 13 wherein said a latch lever has a first and a second circular recess and wherein said roller is held within said first circular recess when said axle lever is in said center position and said roller is held in said second recess when said axle lever is in said eccentric position.

15. A wheel as defined in claim 12 wherein said latch lever is movable by a user to release said roller from being held in said first and second recesses to allow said latch lever to move to the other of said first or second recesses.

16. A wheel as defined in claim 15 wherein said latch lever moves by gravity between said center and said eccentric positions.

17. A method of converting a vehicle between a vehicle having a capability to coast and a vehicle that can be self propelled by the weight of a user, said method comprising the steps of:

providing a vehicle having a front wheel, a rear wheel and a frame spanning therebetween having a footboard for supporting a user, providing a bi-stable axle for the rear wheel comprising a first axle location at the center of the rear wheel and a second axle location located displaced away from said center of said rear wheel, converting said vehicle from a coastable vehicle and a vehicle movable by a pumping movement of a user by moving said axle location between said first axle location and said second axle location.

18. A method as defined in claim 17 wherein said step of providing a vehicle comprises providing a vehicle having handlebars adapted to be gripped by the user and said step of converting said vehicle comprises operating a hand operated device located on the handlebars.

19. A method as defined in claim 17 wherein said step of providing a bi-stable axle for the rear wheel comprises providing a bi-stable axle affixed to an axle lever that is pivotally affixed to the wheel between a first position where the axle is located at the center of the wheel and a second position where the axle is located at an eccentric position displaced with respect to said center of said wheel and the step of converting said vehicle comprises moving the axle lever between the first and the second positions.

20. A method as defined in claim 19 wherein said step of converting said vehicle comprises providing a hand actuator that is operated to move said axle lever between said first and said second positions.

* * * * *